Nov. 10, 1964　　　　K. J. KNUDSEN　　　　3,156,118
THERMOCOUPLE PYROMETER AND ASSOCIATED POTENTIOMETER CIRCUIT
Filed March 17, 1961　　　　　　　　　　　　　2 Sheets-Sheet 1

INVENTOR.
Knud J. Knudsen
BY
H. Gilmer Lehmann
AGENT

Nov. 10, 1964　　　K. J. KNUDSEN　　　3,156,118
THERMOCOUPLE PYROMETER AND ASSOCIATED POTENTIOMETER CIRCUIT
Filed March 17, 1961　　　　　　　　　　　　　2 Sheets-Sheet 2
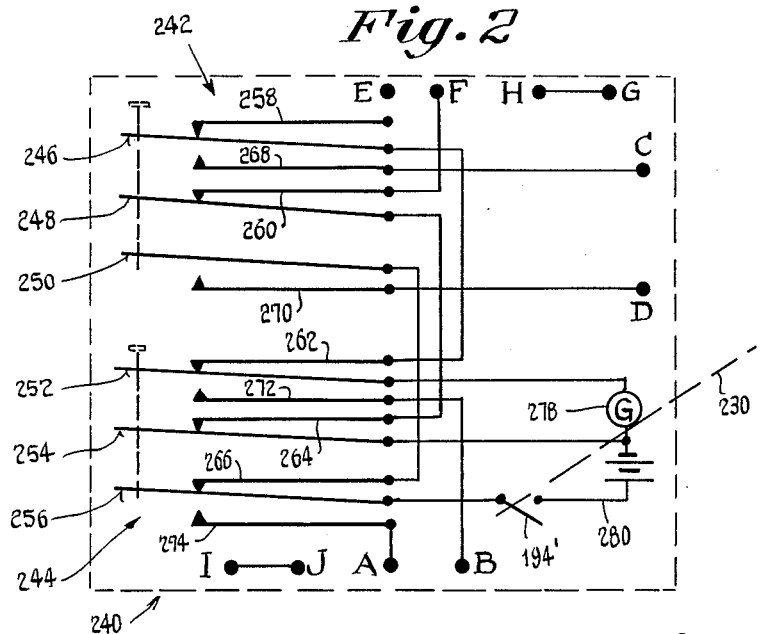
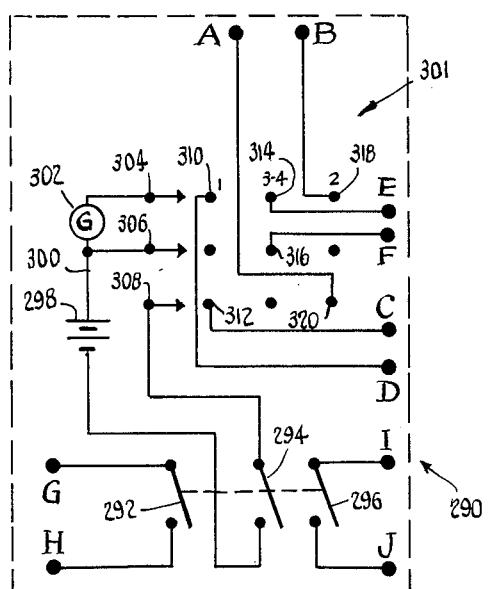
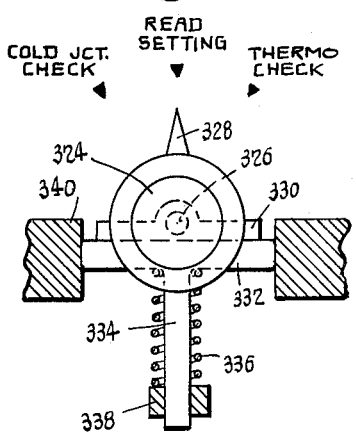
INVENTOR.
Knud J. Knudsen
BY
AGENT

United States Patent Office 3,156,118
Patented Nov. 10, 1964

3,156,118
THERMOCOUPLE PYROMETER AND ASSOCIATED POTENTIOMETER CIRCUIT
Knud J. Knudsen, Middlebury, Conn., assignor to Lewis Engineering Company, Naugatuck, Conn., a corporation of Connecticut
Filed Mar. 17, 1961, Ser. No. 96,596
7 Claims. (Cl. 73—360)

This invention relates to temperature measuring instruments such as high temperature thermometers or pyrometers of the type employing thermocouples and potentiometer circuits.

The invention involves improvements in the pyrometer circuit described and claimed in my Patent No. 2,930,233 dated March 29, 1960 and entitled "Pyrometer Circuit." In this patented pyrometer circuit there is provided a novel and advantageous potentiometer arrangement comprising a tapped drop resistor and series connected slide wire in conjunction with an Ayrton-type tapped shunt resistor connected across the slide wire and a dual selector switch device connected with the tapped resistors and so arranged that a constant load is presented at all times to the energizing means for the potentiometer circuit as the selector switch means and slide wire are adjusted to obtain the desired temperature reading. In the patented circuit, to further insure accuracy of the reading the energized potentiometer circuit and also the energized cold-junction compensating circuit are checked as to their current values so that the exact values used at the factory in calibrating the instrument initially may be duplicated, to prevent error in the readings. In checking such current values a calibrated-scale D.C. instrument movement was employed, which was switched to either of the two circuits to measure the actual different current values, such switching also alternately inserting a resistor load equal to the instrument movement load in the circuit not being checked at the moment, thereby to continuously load both of the batteries so as to effect a stabilization of the voltage output of the same. Upon the checking of the current values being completed, the potentiometer adjustment was used in order to bring to a center, zero point a second non-calibrated null-type instrument movement such as a galvanometer provided in the thermocouple circuit. Thus, the device of my patent was characterized by two instrument movements, and by the substitution of a dummy load equal to the load of the first-mentioned D.C. instrument movement during the checking switching operation wherein such movement was inserted in the circuits to be checked.

The present invention relates to improvements in this type of pyrometer, and one object of the invention is to provide a novel and improved pyrometer circuit of the type outlined, wherein there is effected a simpler mode of operation or procedure and fewer calculations required of the operator in order to accurately obtain the desired temperature readings.

A further object of the invention is to provide an improved pyrometer circuit in accordance with the foregoing, wherein simpler switching means are provided for the purpose of carrying out the necessary current value checks, and wherein such switching means is more foolproof and more easily and quickly understood in its operation.

Yet another object of the invention is to provide an improved pyrometer circuit as above set forth, wherein readings may be more quickly and conveniently made.

Still another object of the invention is to provide an improved pyrometer circuit as characterized, wherein there is less likelihood of failure or malfunctioning of the circuitry, which might adversely affect the readings.

An additional object of the invention is to provide an improved pyrometer as above outlined, wherein fewer expensive and delicate parts are required, and especially wherein but a single non-calibrated sensitive instrument movement of the galvanometer type, in an energized circuit, is utilized for the purpose of both checking the current values of the potentiometer and cold junction circuits and providing the zero or null readings for indications when the operator is adjusting to obtain temperature values.

Other features and advantages will hereinafter appear.

In the drawings accompanying this specification:

FIGURE 1 is a schematic circuit diagram of the potentiometer type pyrometer, simplified and improved as above outlined and as provided by the invention.

FIG. 2 is a schematic representation of a different control switching device which may be substituted for the control switch device shown in FIG. 1, thereby to provide an alternative switching arrangement and mode of operation. The substitution is effected by disconnecting the control switch of FIG. 1 at the letters A, B, C, D, E, F, G, H, I and J and replacing with the switch device of FIG. 2, connecting wires having like letters with each other.

FIG. 3 is a diagrammatic representation of a third type of control switch device which may be usable with the potentiometer circuit of FIG. 1 and substituted for the control switch in FIG. 1 by connecting similarly lettered wires or terminals, in the manner explained in connection with FIG. 2.

FIG. 4 is a fragmentary detail, illustrating diagrammatically the mechanical spring biasing or spring return arrangement provided for the switch of FIG. 3, to effect a spring return of the same to its center, indicating position.

Figure 1:
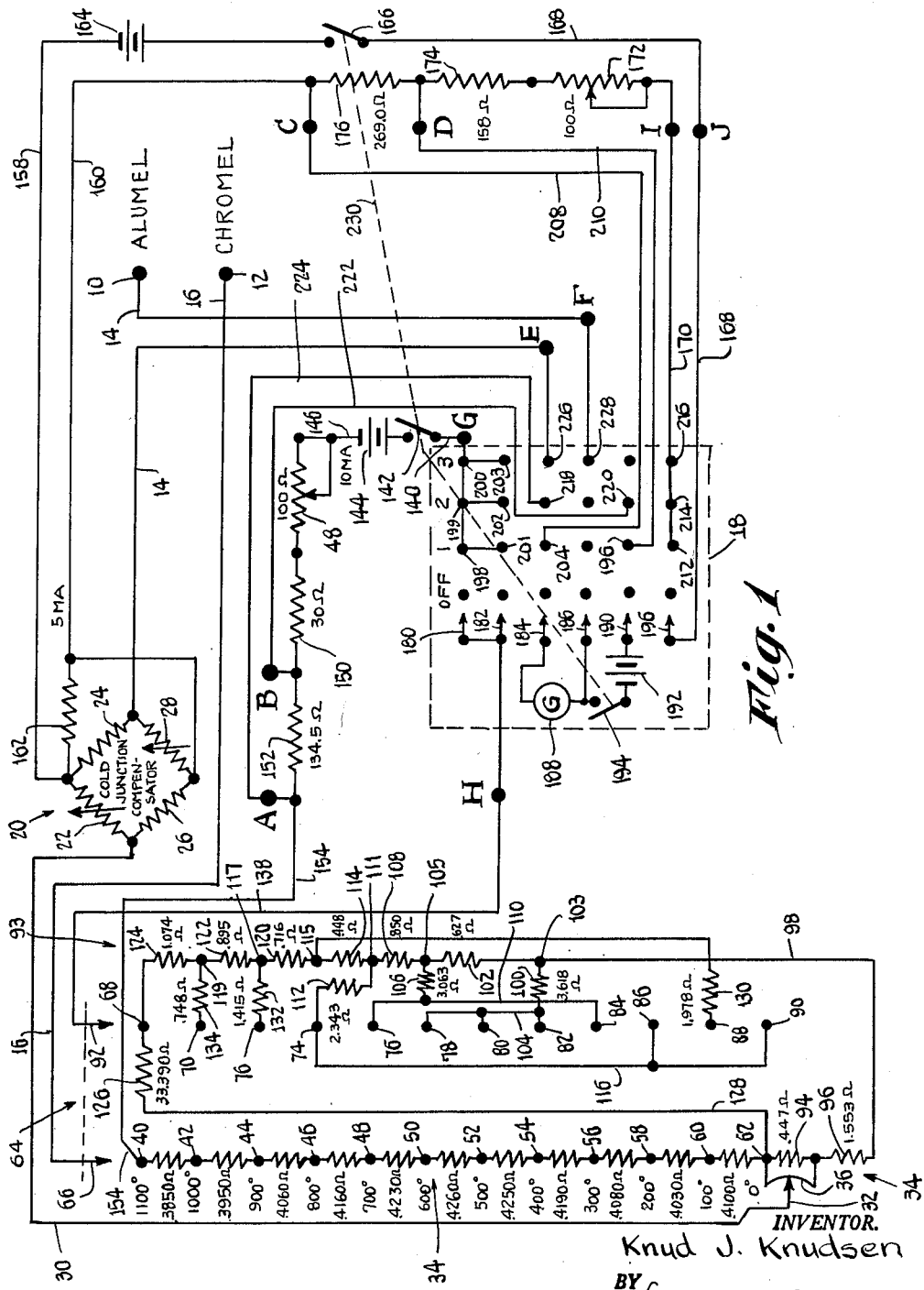

Considering first FIG. 1, the improved pyrometer device as shown comprises a potentiometer-type circuit adapted for use with a thermocouple (not shown) which latter may be connected to terminal posts 10 and 12, further identified by the designations "Alumel" and "Chromel" which indicate the type of metal or alloy constituting the two elements of the couple. Wires 14 and 16 respectively, connected with the terminal posts 10, 12 thereby comprise a two-lead thermocouple circuit. The wire 14 is shown as having two portions or sections which are connected with a novel single control switch device indicated generally by the numeral 18 and which will be described in detail later.

The wire 14 also connects with a cold junction compensating bridge 20 of a type which is known in the art, for purposes of cold junction compensation. The bridge 20 may have legs 22, 24, 26 and 28 connected in a diamond, the legs 24, and 28 being connected to the Alumel lead 14 which is joined to the binding post 10. The bridge legs 22, 26 are connected to a copper wire 30 which is joined with a slider or contact arm 32 comprising a portion of a slide wire device 34 of the potentiometer circuit.

The slide wire device 34 has a resistance element 36 one end of which is joined to a voltage drop resistor of the potentiometer circuit, indicated generally by the numeral 38. The drop resistor 38 may comprise a single tapped resistance element, or it may (as is preferred) comprise a string of individual resistors joined in series, the junctions of the individual resistors being connected to contact points indicated by the even numbers from 40 through 62 respectively, such contact points comprising one deck of a two deck or two section selector switch assemblage designated generally by the numeral 64.

The contact points 40 through 62 are associated respectively with the temperatures 1100°, 1000°, 900°, etc. down to the value 0°, as indicated. The 0° end or contact 62 of the resistor string 38 is connected with one end of the slide wire element 36 as shown, and a switch arm or blade 66 of the switch 64, which is engageable selectively with the contacts 40 through 61, is connected with the "Chromel" wire 16 joined to the terminal post 12.

The second deck or section of the selector switch 64 has contacts numbered evenly from 68 to 90, such contacts being engageable by a second switch arm 92 of the switch 64, which is mechanically coupled to the switch arm 66 for simultaneous movement therewith.

Associated with the resistor string 38 and the slide wire device 34 is an Ayrton type shunt circuit 93 comprising a plurality of resistors, a number of which are connected to the switch contact points 68 through 90. The Ayrton-type shunt circuit comprises a resistor 94 which parallels the slide wire element 36, a resistor 96 connected to the other or remaining end of the slide wire element 36 and in turn joined by a wire 98 to resistors 100 and 102 at a junction point 103. The remaining end of the resistor 100 is joined by a wire 104 to the three switch contacts 78, 80 and 82. The resistor 102 is connected to the junction 105 of two resistors 106 and 108, the resistor 106 being connected by means of a wire 110 to the switch contacts 76 and 84. The resistor 108 is joined to the junction 111 of the two resistors 112, 114, the resistor 112 being connected to the switch contact 74 which in turn is connected by a wire 116 to the switch contacts 86 and 90. The resistors 102, 108 and 114 are part of a string of resistors which includes four additional units numbered 120, 122, 124 and 126 respectively. The resistors of this string are all series connected, and the junction between the resistors 124 and 126 is joined to the switch contact 68. Also, the resistor 126 is joined by a wire 128 to the switch contact 62. The junctures 115, 117 and 119 of the pairs of resistors 114, 120, and 120, 122 and 122, 124 are connected respectively to the switch contacts 88, 72 and 70 through additional resistors 130, 132 and 134.

The switch contacts 40, 42, 44 etc. and 68, 70, 72, etc. are paired so as to be engaged simultaneously by the switch arms 66 and 92 respectively, the pairs being associated respectively with the temperature values, 1100°, 1000°, 900°, etc.

The switch arm 92 is connected with a wire 138 which leads to the switch device 18 and is therein electrically connected to a wire 140. In the wire 140 is an "on-off" switch 142 controlling the current from a battery 144 of the potentiometer circuit. The battery 144 is connected by a wire 146 to a potentiometer type current controlling rheostat 148 which is connected in series with resistors 150 and 152, the latter being joined by a wire 154 with the switch contact 40.

The above generally completes the potentiometer circuit, which is in most respects similar generally to the potentiometer circuit of my patent referred to. The functioning of the string of resistors 38, the slide wire device 34, and the Ayrton-type shunt circuit shown in FIG. 1, comprising the potentiometer circuitry is generally similar to that of my patent, wherein a detailed description of the potentiometer operation is given.

The cold junction compensating bridge circuit further comprises energizing wires 158 and 160, having connected between them a calibrating resistor 162 the ends of which are connected respectively to the junctions of the bridge legs 22, 24 and 26, 28 as shown. The bridge energizing circuit further comprises a battery 164 connected with an "on-off" switch 166 which latter is connected to a wire 168 leading to the switching device 18. The circuit which includes the wire 168 also comprises a wire 170 leading from the switch device 18 and connected to a current-adjusting rheostat 172 which is in turn connected with series resistors 174 and 176, the latter being connected to the wire 160.

With the above connections the wires 168 and 170 are joined through the switch device 18, and when the "on-off" switch 166 is closed, the battery 164 will deliver energy to the cold junction compensating bridge 20 continuously.

It will now be seen that the pyrometer system has two battery-energized circuits, the compensating bridge circuit just described immediately above and having the battery 164 and the potentiometer circuit having the battery 144.

In accordance with the present invention a novel control switch organization, indicated generally by the numeral 18 and novel circuitry associated therewith are provided, by which a simplified operation of the pyrometer is had to enable accurate readings to be quickly and conveniently obtained, with a minimum of calculations being required, utilizing a minimum number of components and especially but a single non-calibrated potentiometer-type sensitive instrument movement. Further, the circuitry associated with the switch device 18 is not likely to be subject to malfunctioning whereby inaccuracies would be had in the temperature readings.

In accomplishing this, the invention provides a multiple-contact and multiple-circuit control switch means and associated connections by which the above-mentioned non-calibrated single instrument movement may be connected either with the specially-arranged drop resistor 152 of the potentiometer circuit, or with the specially-arranged drop resistor 176 of the cold junction circuit to check the current flowing in these circuits, or else connected in the thermocouple circuit comprising the wires 14, 16. Further, the organization provided by the invention is such that the connection of the energized instrument movement in the potentiometer and cold junction circuits does not impose any appreciable or significant load thereon which would impair the accuracy of the instrument and of the readings by drawing current when the instrument movement is transferred to and is taken out of the circuit which it is measuring.

As seen in FIG. 1, the control switch device comprises a six-pole selector switch having four different positions, labelled respectively "off," "1," "2," and "3." Blades or contact arms 180, 182 of the switch are connected together and are joined to the wire 138. Switch contact arms 184 and 186 are connected with a simple non-calibrated zero-center instrument movement such as galvanometer device 188' The switch arm 186 and another arm 190 are connected with an energizing circuit for the galvanometer, comprising a battery in the form of a standard cell 192 which has in its circuit an "on-off" switch 194. The remaining switch arm 196 is connected with the wire 168. Switch contacts 198 through 203 are all connected together and joined to the wire 140. Switch contacts 204 and 206 are connected respectively to wires 208 and 210 which are joined to the ends of the drop resistor 176 disposed in cold junction circuit. Switch contacts 212, 214 and 216 are all joined together and connected with the wire 170. Switch contacts 218 and 220 are connected with wires 222 and 224 respectively, which are joined to the ends of the drop resistor 152 included in the potentiometer circuit. Finally, switch contacts 226 and 228 are connected to the two sections or portions of the thermocouple circuit wire 14.

The "on-off" switches 142, 166 and 194 are arranged for simultaneous operation whereby all switches are either open or else closed, this being indicated by the broken line 230.

The operation of the above described pyrometer circuit is as follows: With the control switch 18 in the "off" position, the circuits having the batteries 144, 164 and 192 are open, whereby no energy is being drawn or used. Assuming that the "on-off" switches 142, 166 and 194 are all closed, when it is desired to obtain a temperature reading, the control switch 18 is placed in the number 1 position. This closes the potentiometer circuit having the battery 144, as well as the cold junction circuit having the battery 164.

Accordingly, current will flow in the potentiometer circuit and in the cold junction bridge circuit.

At the same time, placing the control switch 18 in the number 1 position places the assemblage of instrument movement 188 and series battery 192 in shunt with the drop resistor 176 in the cold junction circuit. The drop resistor has a valve that, for a current through it of 5 milliamperes, it exhibits a voltage drop equal to the potential of the standard cell 192. Adjustment of the rheostat 172 is now made to cause the instrument movement 188 to register at zero or scale center, thereby to establish the total current in the cold junction circuit as 5 milliamperes. The control switch 18 is now shifted to the "2" position, whereupon the energization of the battery circuits is continued while the assemblage of meter 188 and battery 192 is now placed across the special drop resistor 152 in the potentiometer circuit. The resistor has a value that, for a current through it of 10 milliamperes, it exhibits a voltage drop equal also to the potential of the standard cell 192. The rheostat 148 is now adjusted to obtain a center or zero meter deflection, thereby to establish a total current of 10 milliamperes, from the battery 144. These two checks now duplicate the energization of the potentiometer and cold junction circuits which was utilized in effecting the initial calibration of the pyrometer instrument at the factory. The control switching means 18 is now placed in its No. 3 position. The energization of the battery circuits is continued, but now the instrument movement or meter 188 by itself is placed in series with the thermocouple circuit, by being interposed in the wire 14. The battery 192 is not included in the thermocouple circuit. Therefore, the meter 188 may now be used alone as a null deflection instrument, deflectable in either of opposite directions from the center zero point, in order to adjust the potentiometer so as to obtain a temperature reading.

By the provision, in accordance with the invention, of the assemblage of instrument movement 188 and battery 192 in conjunction with the drop resistors 152 and 176 which are permanently connected respectively in the potentiometer and cold junction circuits, it is possible to check current values with the instrument movement 188, without imposing any significant load on these energized circuits. Accordingly, the provision of the battery 192 series-connected to the meter 188 prevents the current in an energized circuit which has been checked from varying or taking an excursion in one direction or the other upon removal of the checking instrument, and this is an important feature of the invention. Further, checking the current values by the zero-deflection method above eliminates the necessity for meter calibration, scale accuracy, and calculation or thought on the part of the operator as to current values, as well as any possibility of confusion of the values required for each check. The special drop resistors automatically take care of this, now.

The selector switch having the arms 66 and 92 is provided with an indicating means, as for example a dial (not shown) having marks from 0° to 1100°, by which each of its positions indicates a temperature value as given in FIG. 1. The slide wire arm 32 is also provided with indicating means, as for example a dial (not shown), having a scale reading from zero degrees to 100 degrees, corresponding to the range of movement of the slider over the element 36.

As is well understood in the art, by properly setting the slider 32 and the switch arms 66, 92 a null point may be reached, as evidenced by zero deflection of the instrument movement 188, whereby the settings of the switch 64 and arm 32 will indicate the temperature of the thermocouple connected with the terminal posts 10, 12. A detailed explanation of this operation of the potentiometer is found in my patent referred to.

The meter 188 need only have a zero-center or null position, being deflectable in opposite directions therefrom for the identified null indications, and such deflectoins may be used to set the current values when the meter is to be used for checking, as above explained.

It will be understood that the "on-off" switch assemblage 142, 166, 194 is not necessary when the control switch 18 is provided with the "off" position or setting as indicated.

With the organization as illustrated in FIG. 1, there is the advantage that but a single simple, non-calibrated instrument movement or meter 188 is required, and that during the checking and operation of the pyrometer the special drop resistors 152 and 176 are always permanently connected in the energized circuits which remain fully energized for the "1," "2," and "3" positions, of the control switch, thereby avoiding intermittent opening and closing of the energized circuits. Moreover, the method of operation is simple and easily understood, since the switch positions "1" and "2" may be designated as the initial check positions for which operations must be performed prior to placing the switch in the No. 3 "temperature reading" position. Therefore, the switch 18 has a logical sequence of settings which is readily understood and remembered, and the switching operation and method of obtaining accurate readings is seen to be extremely simple. Besides, the elimination of one of the two meters disclosed in my patent, results in fewer expensive and delicate, calibrated parts being required. Moreover, the obtaining of accurate readings may be done with the utmost convenience and very quickly.

Given herewith is a table of representative variations or errors which may be expected at the 50° and 100° points or readings of the 0°—100° slide wire range for the various 100° step settings of the selector switch 64, considering the circuit diagram of FIG. 1. The readings and figures represent the error in the true reading at the theoretical minimum millivolts. A somewhat greater accuracy can be obtained by using more taps on the Ayrton shunt. It will be noted that all points can theoretically attain an accuracy of less than one half degree centigrade.

*Table Z*

| 1 | 2 | 3 |
|---|---|---|
| Temperature, Degrees | Decimal Error | Error in Degrees Centigrade |
| 50 | 0.020 | 0.49 |
| 100 | 0.020 | 0.49 |
| 150 | 0.015 | 0.37 |
| 200 | 0.000 | 0.00 |
| 250 | 0.010 | 0.25 |
| 300 | 0.000 | 0.00 |
| 350 | 0.008 | 0.20 |
| 400 | 0.015 | 0.36 |
| 450 | 0.013 | 0.31 |
| 500 | 0.005 | 0.12 |
| 550 | 0.008 | 0.19 |
| 600 | 0.015 | 0.35 |
| 650 | 0.003 | 0.07 |
| 700 | 0.015 | 0.36 |
| 750 | 0.003 | 0.07 |
| 800 | 0.015 | 0.36 |
| 850 | 0.000 | 0.00 |
| 900 | 0.020 | 0.49 |
| 950 | 0.015 | 0.38 |
| 1,000 | 0.000 | 0.00 |
| 1,050 | 0.015 | 0.39 |
| 1,100 | 0.000 | 0.00 |
| 1,150 | 0.015 | 0.40 |
| 1,200 | 0.000 | 0.00 |

In place of the control switch means 18 illustrated in FIG. 1, a different type of control switch means as illustrated in FIG. 2 may be utilized. In effecting a substitution of the switch means of FIG. 2 for that of FIG. 1, the connecting wires to the switch 18 at the points lettered A, B, C, D, E, F, G, H, I and J may be broken or disconnected, and the correspondingly lettered points or terminals of the switch means 240 shown in FIG. 2 may be connected to these lettered points of the pyrometer circuit.

The switch means shown in FIG. 2 includes an "on-off" switch 194′ which replaces the "on-off" switch 194 in the switch assemblage, the switch 194′ being mechanically coupled to the "on-off" switches 142 and 166 as indicated by the broken line 230.

The switch means 240 shown in FIG. 2 comprises two manually operable multiple contact and multiple circuit push button switches designated generally by the numerals 242 and 244 respectively. The push button switch 242 has three arms 246, 248 and 250 respectively, said arms being simultaneously operable or depressible. The push button switch 244 has depressible, mechanically coupled contact arms or blades 252, 254 and 256 respectively. Cooperable contacts 258, 260, 262, 264 and 266 normally engage respectively the blades 246, 248, 252, 254 and 256. Other cooperable contacts 268, 270, 272 and 274 are normally disengaged from the blades 246, 250, 252 and 256 respectively, but become engaged upon the blades being depressed whereas the normally engaged contacts indicated above become separated from the blades. This normal operation of blade-type push-button switches is well understood, and may be readily seen from an inspection of FIG. 2.

In FIG. 2, connection points H and G are connected together, and also connection points I and J. The blades 246, 248 and 250 are connected respectively to contacts 262, 264 and 266. The blades 252, 254 and 256 are connected respectively to the two terminals of an instrument movement or meter 278 and to the "on-off" switch 194′, which latter is connected by a wire 280 to a standard cell 282 in turn electrically joined to the blade 254 and associated terminal of the meter 278. Contacts 258, 268, 260 and 270 are connected respectively to the connection points E, C, F and D. Contacts 272 and 274 are connected respectively to the connection point B and A.

The above completes the circuitry associated with the two push-button switches 242 and 244. The electrical connections effected by the switch means 240 of FIG. 2 are in general similar to those effected by the switch means 18 in FIG. 1, as concerns checking the potentiometer and cold junction energizing circuits. Depressing the push button switch 242 connects the meter 278 and cell 282 for checking the current in the cold junction, as supplied by the battery 164. Depressing the push button switch 244 connects the meter 278 and standard cell 282 to the potentiometer circuit, for checking the current supplied by the battery 144. When neither push-button switch is depressed or actuated, the meter 278 by itself is connected in the thermocouple circuit comprising the two wire sections 14. Thus, the calibration check is first effected by operating first one push button switch and then the other and adjusting the currents by the proper rheostats, and thereafter the reading is obtained by adjusting the potentiometer drop resistor string and slide wire with both of the push button switches released.

The advantages mentioned above in connection with the circuit of FIG. 1 are obtained as well when the switch means 240 of FIG. 2 is substituted for the switch means 18 of FIG. 1. A simple understanding of the required operations may be had, and there is provided a logical sequence in the switching procedure, for checking and obtaining the necessary accurate temperature readings. To open circuit the battery lines, the mechanically coupled "on-off" switches 142, 166 and 194′ are used.

FIG. 3 illustrates yet another type of switching means 290 which may be substituted for the switch device 18 of FIG. 1. As explained above in connection with FIG. 2, connections to the switching means 18 of FIG. 1 are broken at the letters A through J respectively, and the correspondingly lettered wires of the switching means 290 in FIG. 3 are connected to the like letters of the pyrometer circuit.

The switch device 290 comprises three "on-off" switches 292, 294 and 296, the switches 292 and 296 being connected as shown to the connection points G, H, I and J. The "on-off" switch 294 is connected to a standard cell 298 which is in turn connected by a wire 300 to an instrument movement or meter 302. The switch means 290 further comprises a rotary type multiple pole and circuit, multiple position switch having switch arms 304 and 306 connected respectively to the two terminals of the meter 302.

A third switch arm 308 is connected with the "on-off" switch 294, as shown. There are three positions and three sets of contacts for the rotary switch 301, the settings being indicated by the numbers "1," "2," "3–4." The position "1" contacts 310 and 312 of the switch 301 are joined to the connection points D and C respectively. The position "3–4" contacts 314, 316 are joined to the connection points E and F respectively, and the position "2" contacts 318, 320 are joined respectively to the connection points B and A.

The electrical connections established by the switch means 290 shown in FIG. 3 for effecting a check of the pyrometer and thermocouple circuits and for obtaining temperature readings are the same as those effected by the switch means 18 and 340 shown respectively in FIGS. 1 and 2.

The invention further provides that the switch means 301 shown in FIG. 3 be normally biased to and yieldably held in the center position indicated by the numbers "3–4," which corresponds to the temperature indicating connection of the instrument movement 302. A suitable spring arrangement may be utilized to yieldably hold the switch arms 304, 306 and 308 in the center "3–4" position.

One such means is illustrated in FIG. 4, wherein a knob 324 is carried by the switch shaft 326, the said knob having a pointer 328 which is cooperable with three switch-setting indicia shown as "thermocheck," "read setting" and "cold junction check." On the shaft 326 there is a transversely extending flat shoe 330 which is engaged by the flat face of a plunger 332 having a shank 334 carrying a compression coil spring 336. Bearing or guide means 338 and 340 are provided for the plunger 332, by which the latter may be shifted from the position shown to a downward, retracted position under the force exerted by the shoe 330 as the knob 334 is turned in either one direction or the other. Upon release of turning force from the knob 324 the plunger 332 will again restore the knob and shaft 326 together with the shoe 330 to the centralized position shown.

When the rotary switch 301 is in the No. 1 position (knob 324 turned to the left) a check is had of the cold-junction, energized bridge circuit. When the knob 322 is turned from the center position of FIG. 4 to the right, a check is had of the thermocouple circuit. Upon release of the knob 324 from either of the above check positions it will be returned automatically to the centralized position wherein the meter 302 is connected for obtaining null indications as required in order to secure temperature readings from the settings of the potentiometer switch 64 and slide wire arm 32.

It will now be understood from the foregoing that in each of FIGURES 1–3 a novel switch means and novel circuitry are provided in conjunction with a "constant-load type" potentiometer system employing an Ayrton-type shunt circuit and energized potentiometer and cold-junction circuits, which requires but a single, non-calibrated instrument movement. The operation of the switching device and circuitry is simple, easily understood and foolproof. The check operations and readings may be quickly made with a maximum of convenience, and the circuitry involving the permanently connected drop resistors 152 and 176 is not likely to malfunction whereby erroneous readings would be obtained.

Referring to FIG. 1, the following components may have the values given: For the drop resistor 152, a resistance of 134.5 ohms. For the resistor 150, a value of 30 ohms. The rheostat 148 may have a resistance of 100 ohms, and this same resistance may be used for the rheostat 172. The resistor 174 may have a value of 158 ohms, the drop resistor 176 may have a value of 269.0 ohms. The total or effective resistance of the slide wire element 56 and the shunt resistor 94 is .447 ohm. The resistor 96 has a resistance of 1.553 ohms. The normal calibrated operating current in the wires 158 and 160 is 5 milliamperes, and the normal calibrated operating current from the potentiometer battery 144 is 10 milliamperes.

The values of the resistors in the potentiometer string are indicated in FIG. 1, and this is also true of the resistors making up the Ayrton-type shunt circuitry. Given below are calculations and computations by which the values set forth in the circuit of FIG. 1 have been arrived at. The selection of values of the resistors of the potentiometer string 38 and of the Ayrton-type shunt 93 may be effected as follows: Consider first the potentiometer string 38. Having in mind the millivolt output of a Chromel-Alumel thermocouple and the desired power level of a potentiometer-type pyrometer, a total potentiometer current of 10 ma. to be delivered by the battery 144 may be arbitrarily selected. The potentials which will exist for the temperatures of from 0° to 1100° in 100° steps, measured from the switch contact 62 to the eleven remaining respective switch points 40, 42, 44, 46, etc. may be tabulated in any suitable manner. An example of actual values is given in Table V below, columns 1 and 2.

Table V

| 1 | 2 | 3 |
|---|---|---|
| Temperature of Couple, Degrees | Millivolt Output | Millivolt Difference |
| 1,200 | 48.89 | |
| | | 3.73 |
| 1,100 | 45.16 | |
| | | 3.85 |
| 1,000 | 41.31 | |
| | | 3.95 |
| 900 | 37.36 | |
| | | 4.06 |
| 800 | 33.30 | |
| | | 4.16 |
| 700 | 29.14 | |
| | | 4.23 |
| 600 | 24.91 | |
| | | 4.26 — Average at 4.245 Mv. — Average at 4.175 Mv. — Average at 4.08 Mv. |
| 500 | 20.65 | |
| | | 4.25 |
| 400 | 16.40 | |
| | | 4.19 |
| 300 | 12.21 | |
| | | 4.08 |
| 200 | 8.13 | |
| | | 4.03 |
| 100 | 4.10 | |
| | | 4.10 |
| 0 | 0 | |

Consider a current of 10 ma., and using Ohm's Law, tables W and X of resistance values, as given below, are obtained as follows: For a millivolt value of 4.10 from point 62 to point 60, the resistance between these points would be:

$$R = \frac{4.10}{10} = .410 \text{ ohm.}$$

For point 58, it would be:

$$R = \frac{8.13}{10} = .813 \text{ ohm, etc.}$$

Table W

| 1 | 2 | 3 | 4 |
|---|---|---|---|
| Temperature, Degrees Centigrade | Switch Points | Resistance From Switch Point 62 to Preceding Switch Points | Resistance Differential |
| 1,100 | 40 | | |
| | | 4.131 | .395 |
| 1,000 | 42 | | |
| | | 3.736 | .406 |
| 900 | 44 | | |
| | | 3.330 | .416 |
| 800 | 46 | | |
| | | 2.914 | .423 |
| 700 | 48 | | |
| | | 2.491 | .426 |
| 600 | 50 | | |
| | | 2.065 | .425 |
| 500 | 52 | | |
| | | 1.640 | .419 |
| 400 | 54 | | |
| | | 1.221 | .408 |
| 300 | 56 | | |
| | | 0.813 | .403 |
| 200 | 58 | | |
| | | 0.410 | .410 |
| 100 | 60 | | |

Table X

| 1 | 2 | 3 |
|---|---|---|
| Temperature Range, Degrees Centigrade | Calculated Individual Resistor Values of Potentiometer Drop Resistor | Actual Values Used in Potentiometer Drop Resistor |
| 0–100 | 0.410 | 0.408 |
| 100–200 | 0.403 | 0.403 |
| 200–300 | 0.408 | 0.408 |
| 300–400 | 0.419 | 0.4175 |
| 400–500 | 0.425 | 0.4245 |
| 500–600 | 0.426 | 0.4245 |
| 600–700 | 0.423 | 0.4245 |
| 700–800 | 0.416 | 0.4175 |
| 800–900 | 0.406 | 0.408 |
| 900–1,000 | 0.395 | 0.395 |
| 1,000–1,100 | 0.385 | 0.385 |
| 1,100–1,200 | 0.373 | 0.373 |

For practical purposes, it will be noted from column 3 of Table X that for the temperatures 400°, 500° and 600°, actual resistor values have been averaged at .4245 ohm; that for the temperatures of 300° and 700° the values have been averaged at .4175 ohm; and that for the temperatures of 0°, 200° and 800° they have been averaged at .408 ohm. By doing this a lesser total number of resistors is required, with but little compromise in accuracy of the readings.

Considering now the Ayrton-type shunt 93 there may be arbitrarily selected a current of 9.5 ma. for the averaged resistance of .4245 ohm (400°, 500° and 600° temperatures) which at 10 ma., gives an averaged 4.245 millivolt value. Now for a particular desired value of millivolts, as for example a value of "b" millivolts, the corresponding potentiometer current will be:

$$I_b = \frac{9.5 \ (b)}{4.245}$$

Arbitrarily select a total load resistance, as for example a resistance of 40 ohms.

If the factor $$\frac{9.5}{4.245}$$

is called "a," then the current through the potentiometer $I_b = ab$ (for "b" millivolts).

Where "x" is the resistance value from the switch point 62 to any of the junction points 68, 119, 117, 115, 111, 105, or 103, it may now be stated that, $$ab(40-x) = (10-ab)x$$

simplifying and solving for $x$:

$$40ab - abx = 10x - abx$$
$$10x = 40ab$$
$$x = 4ab$$

In the present instance, $$4a = 8.9517079 \text{ (numerically)}$$

Then, for the ranges of 400° up to 700° where the 4.245 millivolts (average) exists, $$x = 8.9517079 \ (4.245) = 38.000 \text{ ohms.}$$

For the ranges of 300° to 400° and 700° to 800° where the millivolts are averaged at 4.175, $$x = 8.9517079 \ (4.175) = 37.373 \text{ ohms.}$$

For the ranges of 0° to 100°, 200° to 300° and 800° to 900° where the millivolts are averaged at 4.080, $$x = 8.9517079 \ (4.080) = 36.523$$

Following this for the other temperature ranges, Table Y below may be obtained.

*Table Y*

| 1 | 2 | 3 | 4 | 5 | 6 |
|---|---|---|---|---|---|
| Millivolts (b) | Shunt Resistance From Point 62 to Junction Points 68, 119, 117, 115, 111, 105 and 103 (x) | Resistance Differential | Value of 40−x | Shunt Network Combined | Series Resistance Required |
| 4.245 | 38.00 |  | 2.000 | 1.900 | 3.618 |
|  |  | 0.627 |  |  |  |
| 4.175 | 37.373 |  | 2.627 | 2.455 | 3.063 |
|  |  | 0.850 |  |  |  |
| 4.080 | 36.523 |  | 3.477 | 3.175 | 2.343 |
|  |  | 0.448 |  |  |  |
| 4.030 | 36.075 |  | 3.925 | 3.540 | 1.978 |
|  |  | 0.716 |  |  |  |
| 3.950 | 35.359 |  | 4.641 | 4.103 | 1.415 |
|  |  | 0.895 |  |  |  |
| 3.850 | 34.464 |  | 5.536 | 4.770 | 0.748 |
|  |  | 1.074 |  |  |  |
| 3.730 | 33.390 |  | 6.610 | 5.518 | 0.000 |
|  |  | 33.390 |  |  |  |

Considering columns 5 and 6 of the above Table Y, since the network resistance must be constant, the network combined resistance from junction point 62 to any junction point listed above is:

$$\frac{(40-x)x}{40}$$

(values given in column 5.)

The series resistance values of column 6 are obtained by subtracting the column 5 values from the maximum value in column 5, namely 5.518 ohms, representing the resistance between the junction point 62 and the junction point 68.

Variations and modifications may be made within the scope of the claims and portions of the improvements may be used without others.

I claim:

1. In a potentiometer-type pyrometer for connection to a thermocouple, a potentiometer circuit including a fixed series drop resistor permanently connected therein; a thermocouple circuit connected with the potentiometer circuit; a cold junction compensating circuit in series with said thermocouple circuit, said compensating circuit including a fixed series drop resistor permanently connected therein, and said compensating and potentiometer circuits having separate energizing means to effect a continuous flow of current therethrough and through the series drop resistors; and a combined current-check and indicator means for checking the current flowing through the potentiometer and compensating circuits and for providing current indications from the thermocouple circuit, said means including solely one deflecting instrument movement, including a standard battery potential source and connector means for joining the latter in series with said movement, and including manually operable switch devices having a common operator and including controlled circuits, effecting plural connections of not only the instrument movement but also of the potential source to either of said drop resistors to establish such movement and potential source as a series-joined unit at different times either across the drop resistor of the potentiometer circuit or across the drop resistor of the compensating circuit, or else effecting connections of the instrument movement alone in series in the thermocouple circuit, thereby to enable the series-joined unit respectively to check the potentiometer circuit current or the compensating circuit current, or else enable the instrument movement alone to provide readings from the thermocouple circuit, said switch devices and controlled circuits shunting one or the other of the said fixed, series drop resistors across the said series-joined unit to effect the said current checks; and battery protective means comprising a multiple switch organization having a common manual control and having circuitry connected with the said energizing means and with standard potential source, for connecting said means and source simultaneously in, and for disconnecting them simultaneously from, their respective circuits, thereby to prevent the potential source from having excessive loading such as would result if the source were connected with an unenergized drop resistor.

2. A pyrometer as in claim 1, in which the said switch devices comprise a pair of multiple contact spring-biased push button switches arranged so that depressing one connects the movement with the potentiometer circuit and depressing the other connects the movement with the compensating circuit.

3. A pyrometer as in claim 2, in which the movement is normally connected with the thermocouple circuit when the switches are not depressed.

4. A pyrometer as in claim 1, in which the said switch devices comprise a multiple-pole selector switch having three juxtaposed aligned settings the center of which connects the movement with the thermocouple circuit to provide readings therein, one outer setting connecting the movement with the potentiometer circuit to check the current thereof and the other outer setting connecting the movement with the compensating circuit to check the current thereof.

5. A pyrometer as in claim 4, in which the selector switch is of the rotary type, and in which there is a rotary indicator connected with the switch and having three positions indicating the two outer "check" settings and the center "read" setting of the switch.

6. A pyrometer as in claim 4, in which there are spring means biasing the selector switch to normally occupy the center setting.

7. A pyrometer as in claim 1, in which the common operator for the switch devices comprises the common manual control of the switch organization.

References Cited in the file of this patent

UNITED STATES PATENTS

| | | |
|---|---|---|
| 1,179,108 | Kaisling | Apr. 11, 1916 |
| 2,136,858 | Michel | Nov. 15, 1938 |
| 2,662,406 | Wohlgemuth | Dec. 15, 1953 |
| 2,930,233 | Knudsen | Mar. 29, 1960 |

FOREIGN PATENTS

| | | |
|---|---|---|
| 766,531 | France | Apr. 16, 1934 |